(12) United States Patent
Berg et al.

(10) Patent No.: US 9,014,842 B2
(45) Date of Patent: Apr. 21, 2015

(54) METHOD AND MONITORING UNIT FOR CHECKING POSITION VALUES

(75) Inventors: Martin von Berg, Uebersee (DE); Thilo Schlicksbier, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 470 days.

(21) Appl. No.: 13/433,562

(22) Filed: Mar. 29, 2012

(65) Prior Publication Data

US 2012/0249028 A1 Oct. 4, 2012

(30) Foreign Application Priority Data

Mar. 29, 2011 (DE) .......................... 10 2011 006 300

(51) Int. Cl.
*G06F 19/00* (2011.01)
*G01D 5/244* (2006.01)

(52) U.S. Cl.
CPC ........ *G01D 5/24476* (2013.01); *G01D 5/24495* (2013.01)

(58) Field of Classification Search
USPC .......... 700/216, 247, 3, 91, 251; 702/150, 15, 702/152, 188, 38, 141, 412; 704/275; 318/626, 630, 568.1, 400.05
See application file for complete search history.

(56) References Cited

U.S. PATENT DOCUMENTS

| | | | | |
|---|---|---|---|---|
| 4,792,738 A | * | 12/1988 | Yamazaki et al. | 318/630 |
| 4,907,435 A | * | 3/1990 | Schulze | 72/21.1 |
| 5,331,232 A | * | 7/1994 | Moy et al. | 318/568.11 |
| 5,387,969 A | * | 2/1995 | Marantette | 356/4.09 |
| 5,687,103 A | | 11/1997 | Hagl et al. | |
| 5,739,660 A | * | 4/1998 | Gnann | 318/626 |
| 6,418,396 B2 | * | 7/2002 | Hagl | 702/150 |
| 6,498,653 B1 | * | 12/2002 | Wang | 356/498 |
| 2002/0197122 A1 | * | 12/2002 | Mizutani et al. | 409/132 |
| 2004/0107068 A1 | | 6/2004 | Chapman et al. | |
| 2009/0222134 A1 | * | 9/2009 | Franke et al. | 700/251 |

FOREIGN PATENT DOCUMENTS

| | | |
|---|---|---|
| EP | 0 171 579 | 2/1986 |
| EP | 0 660 209 | 6/1995 |
| EP | 2023092 | 2/2009 |
| EP | 2072964 | 6/2009 |

OTHER PUBLICATIONS

European Search Report, dated Jun. 6, 2014, issued in corresponding European Patent Application No. 2011194879.0.

* cited by examiner

*Primary Examiner* — Kidest Bahta
(74) *Attorney, Agent, or Firm* — Kenyon & Kenyon LLP

(57) ABSTRACT

A method for checking position values using a monitoring unit to which position values of a position measuring device are supplied at time intervals of a query interval, includes: calculating a movement value from at least two position values and the time interval of their arrival; calculating an expected value for a position value to be checked that follows the at least two position values, by adding the most recent of the at least two position values and a change in position that results from the movement value and the time until the position value to be checked arrives; determining a position expectation interval from the expected value and a maximum position interval; comparing the position value to be checked to the position expectation interval; and outputting a signal that indicates the result of the comparison.

10 Claims, 4 Drawing Sheets

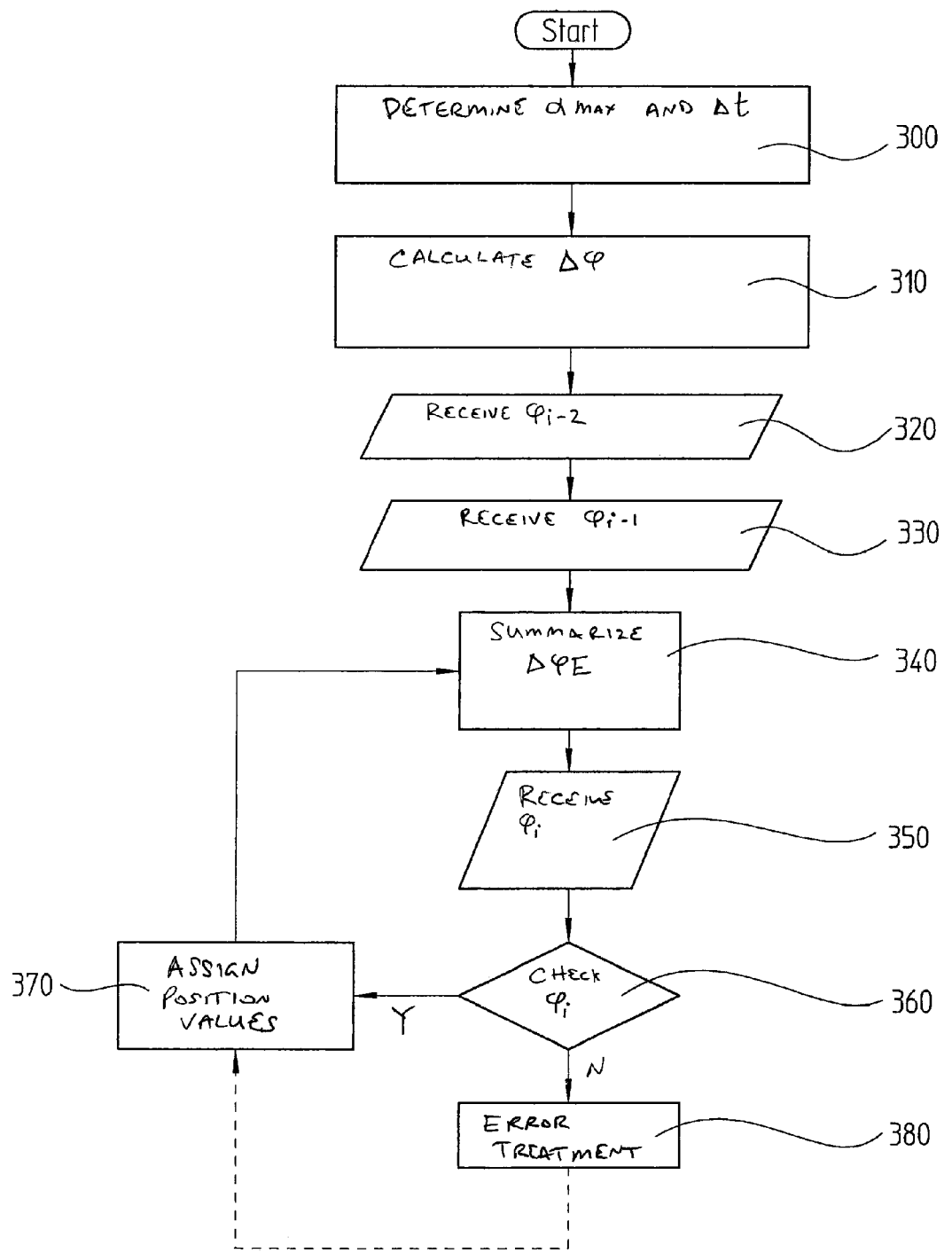

METHOD AND MONITORING UNIT FOR CHECKING POSITION VALUES

CROSS-REFERENCE TO RELATED APPLICATIONS

The present application claims priority to Application No. 10 2011 006 300.5, filed in the Federal Republic of Germany on Mar. 29, 2011, which is expressly incorporated herein in its entirety by reference thereto.

FIELD OF THE INVENTION

The present invention relates to a method for monitoring position values and to a monitoring unit for checking position values. Furthermore, the present invention relates to a drive control having a monitoring unit.

BACKGROUND INFORMATION

Drive controls are used in the field of automated system technology for controlling movement sequences in machines, in particular machine tools, production systems and robot arms. Their operating principle consists of converting movement setpoint values into actuating signals for motors, to measure, as actual values, the movement induced by the motors by position measuring devices, and to adapt the actuating signals such that setpoint and actual values match as closely as possible.

Position measuring devices which supply an absolute position value are becoming more prevalent in such drive controls. This does away with certain disadvantages of so-called incremental position measuring devices, such as the need to perform a reference execution following the activation, in order to find a reference position which serves as reference point for the further position measurement by counting graduation marks.

The transmission of absolute position values is mainly implemented with the aid of serial data interfaces because these interfaces require only a few data transmission lines and provide high data transmission rates nevertheless. A multitude of standard interfaces has come to dominate in the field of automation technology. Popular representatives of serial interfaces for position measuring devices are, for example, the EnDat interface and the SSI interface. The basis of the EnDat interface is described in European Patent No. 0 660 209, and the function of the SSI interface is described in European Patent No. 0 171 579.

Because the movement sequences of machines are ultimately determined by position values generated in absolute position measuring devices and digitally transmitted to the drive control via serial interfaces, it is of the utmost importance for the safe operation of a machine that errors in the generation and transmission of the position values are avoided. In the event that an error has occurred nevertheless, it is also important that such an error is highly likely to be discovered before it can affect a movement sequence. Otherwise, even a single incorrectly generated and transmitted bit in a position value may cause an uncontrollable, unforeseeable and jerky motion of the machine. In addition to considerable damage to the machine, life-threatening situations for the operating personnel present in the operating area of the machine may arise as well. As a result, the detection of faulty position values is given the highest priority in the field of automation technology.

SUMMARY

Example embodiments of the present invention provide a method with whose aid faulty position values are detected.

According to example embodiments of the present invention, a method for checking position values using a monitoring unit, to which position values of a position measuring device are supplied at time intervals of a query interval, includes: calculating a movement value from at least two position values and a time interval of arrival of the at least two position values; calculating an expected value for a position value to be checked that follows the at least two position values by adding a most recent of the at least two position values and a change in position that results from the movement value and a time until the position value to be checked arrives; determining a position expectation interval from the expected value and a maximum position interval; comparing the position value to be checked to the position expectation interval; and outputting a signal that indicates a result of the comparison.

The movement value may include at least one of (a) a speed value, (b) an acceleration value, and (c) a jerk.

The movement value may include an estimated speed value that is formed by generating a differential quotient from the two position values that arrived last at the monitoring unit and from the query interval.

The determination of the position expectation interval may be performed prior to the arrival of the position value to be checked.

The method may include measuring the query interval by a time measurement unit of the monitoring unit.

According to example embodiments of the present invention, a monitoring unit for checking position values transmitted from a position measuring device to a drive control at time intervals of a query interval, includes: a processing unit adapted: to receive the transmitted position values; to calculate a movement value from at least two position values and from the time interval of arrival of the at least two position values; to calculate an expected value for a position value to be checked that follows the at least two position values, by adding a most recent of the at least two position values and a change in position that results from the movement value and a time until the position value to be checked arrives; and to determine a position expectation interval from the expected value and a maximum position interval; and a comparator unit adapted to compare the position value to be checked to the position expectation interval and to generate a signal that indicates a result of the comparison.

The monitoring unit may include a protocol unit adapted to receive interface signals, to separate position values included in the interface signals, and to output the position values to the processing unit and to the comparator unit.

The monitoring unit may include a memory unit adapted to store at least one of (a) data required by the processing unit, (b) the position interval, and (c) the query interval.

The monitoring unit may include a time measurement unit adapted to measure the query interval.

According example embodiments of the present invention, a drive control includes the monitoring unit.

Further features and aspects of example embodiments of the present invention are described in more detail below with reference to the appended Figures.

BRIEF DESCRIPTION OF THE DRAWINGS

FIG. 4 is a flow chart of a method according to an example embodiment of the present invention.

DETAILED DESCRIPTION

Figure 1:
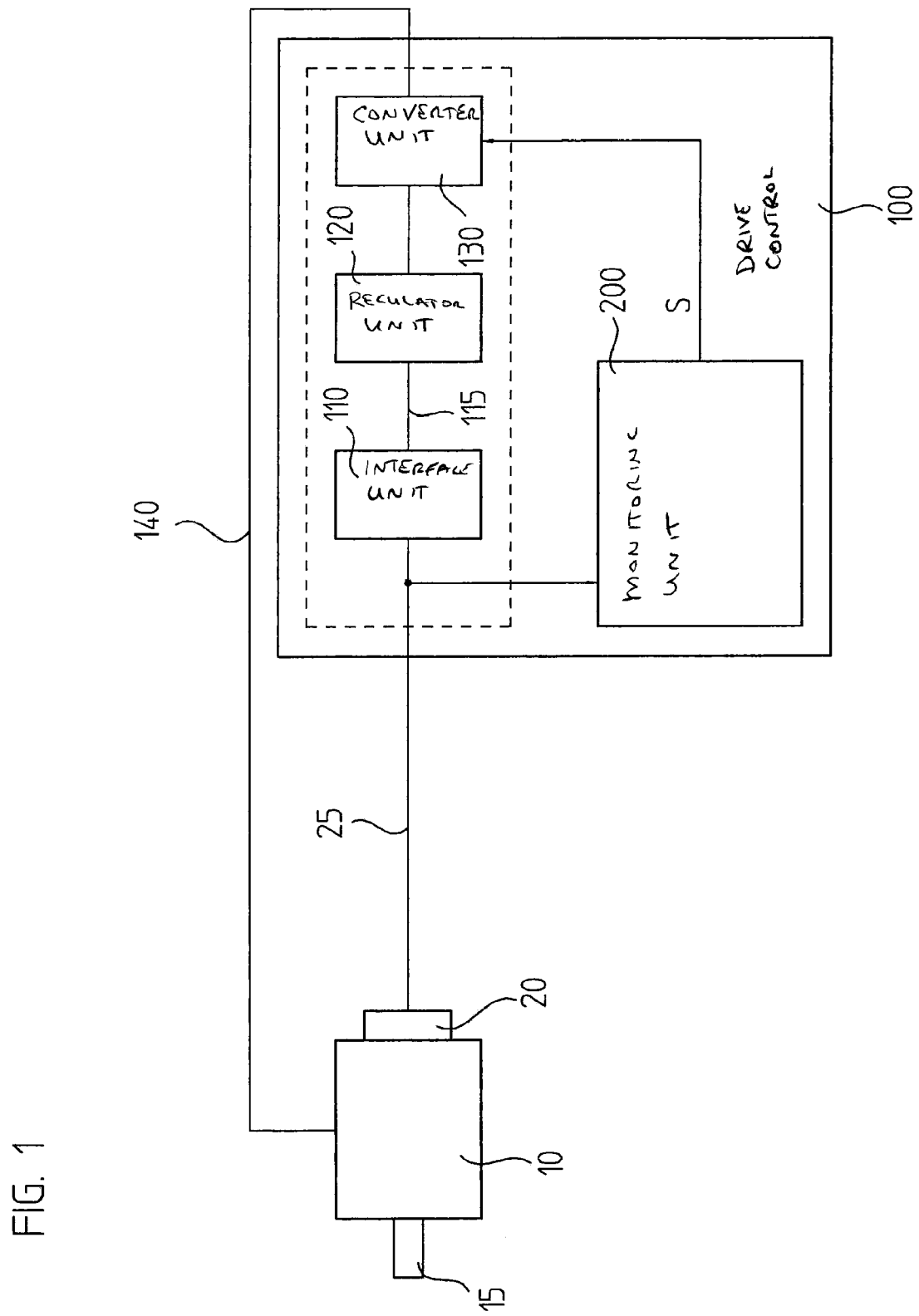
FIG. 1 is a block diagram of a drive control.

FIG. 1 shows a block diagram of a drive control. In this example a motor 10, whose motor shaft 15 moves a machine component, is used for the drive. The rotation of motor shaft 15, which is a measure for the machine component's movement, is measured by a position measuring device 20 implemented in the form of a motor rotary encoder. For this purpose motor shaft 15 is connected to the shaft of the motor rotary encoder in torsionally fixed manner.

Instead of the motor rotary encoder, it is also possible to use a length measuring device as position measuring device 20, for instance in order to measure a linear movement of the moved engine component caused by the rotation of motor shaft 15. In the same manner, motor 10 may be a linear motor.

To transmit position values $\phi i$ measured by position measuring device 20 to a drive control 100, position measuring device 20 is connected to drive control 100 via a data transmission channel 25.

Drive control 100 includes an interface unit 110, a regulator unit 120, and a converter unit 130. The task of regulator unit 120 consists of actuating motor 10 in such a way that it executes movement sequences that are specified by, for instance, a computer program, especially an NC program. Regulator unit 120 generates setpoint values for this purpose, compares these setpoint values to actual values (position values of the position measuring device) and calculates actuating signals for converter unit 130 therefrom. Converter unit 130 then converts the actuating signals into motor control signals, which are transmitted to motor 10. For this purpose motor 10 is connected to converter unit 130 via a motor cable 140.

To request current position values $\phi i$ from position measuring device 20, regulator unit 120 is connected to interface unit 110 via an internal interface 115. It communicates, via data transmission channel 25 and according to an interface protocol, with an interface unit in position measuring device 20. The interface signals required for the communication include commands, such as position request commands, which are transmitted to position measuring device 20 by drive control 100, as well as data, in particular position values $\phi i$, which are transmitted from position measuring device 20 to the drive control. In addition, the interface signals may include a clock signal for synchronizing the data transmission.

The comparison of setpoint and actual values and the calculation of the actuating signals for converter unit 130 does not take place continuously but at discrete time intervals, which are specified by the so-called regulator cycle time. Typical values for the regulator cycle time lie within the range of a few microseconds to a few milliseconds. The regulator cycle time also specifies query interval $\Delta t$ at which position values $\phi i$ are requested from position measuring device 20 via interface unit 110 during a control action.

According to example embodiments of the present invention, interface signals which include position values $\phi i$ are transmitted not only to regulator unit 120, but also to a monitoring unit 200 for an error check. As shown in FIG. 1, this may be done by connecting monitoring unit 200 to data transmission channel 25 parallel to interface unit 110. However, as an alternative, monitoring unit 200 may also be connected to internal interface 115. In both cases the original data connection from position measuring device 20 to regulator unit 120 via data transmission channel 25, interface unit 110 and internal interface 115 is maintained. This provides the special advantage that the drive control, as is conventional, is able to be operated even without monitoring unit 200. Monitoring unit 200 may therefore be arranged as an independent supplementary module which is used only when the drive places especially high demands on safety, such as when operating personnel may be present in the operating environment of a machine. Monitoring unit 200 outputs the result of the check to converter unit 130 in the form of a signal S, or also to regulator unit 120, so that suitable measures may be taken, e.g., the motor stopped or the entire machine in which the monitored drive is operated, deactivated.

Figure 2:
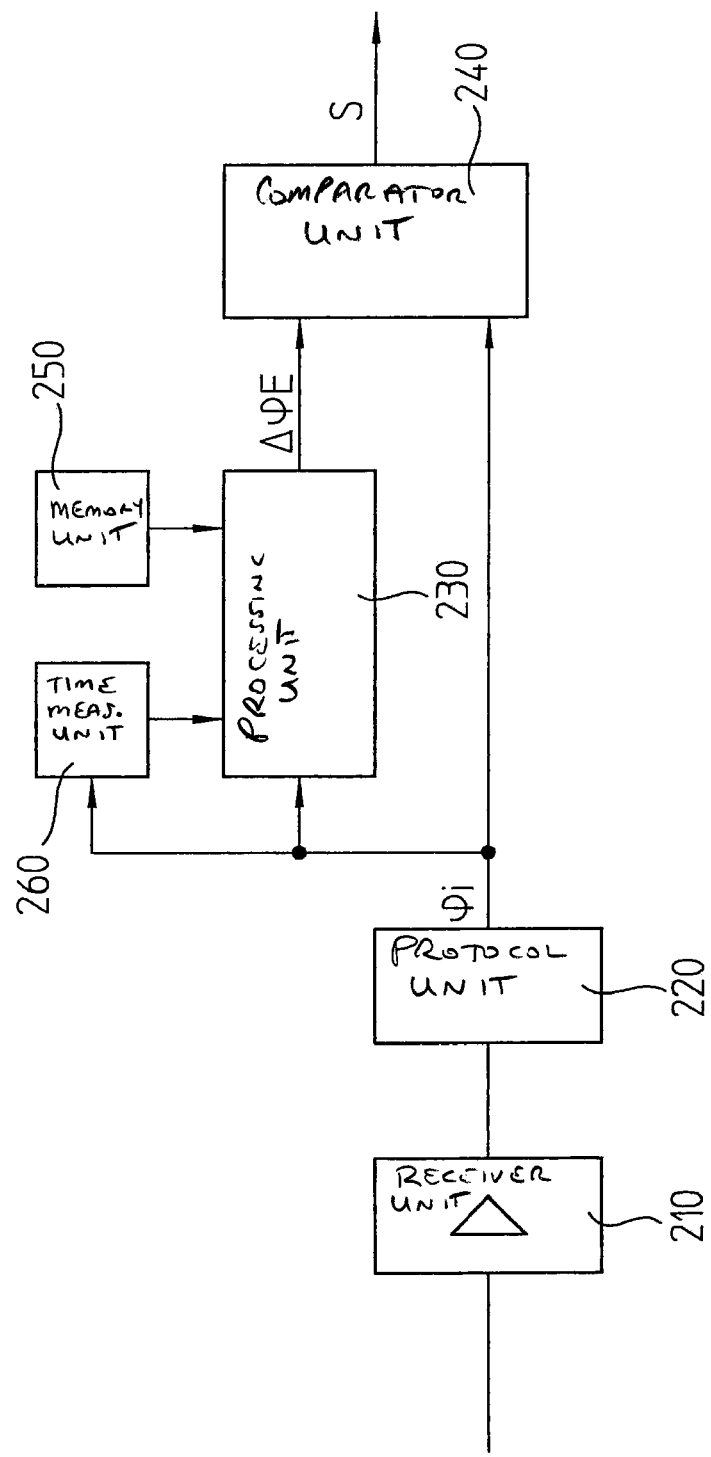
FIG. 2 is a block diagram of a monitoring unit according to an example embodiment of the present invention.

FIG. 2 shows a block diagram of a monitoring unit 200 according to an example embodiment of the present invention. The interface signals arriving at monitoring unit 200 from data transmission channel 25 or internal interface 115 are first forwarded to a receiver unit 210. This is necessary especially when data transmission channel 25 is used as source for the interface signals, because the data transmission across longer cable connections frequently takes place in differential manner, in particular according to the RS-485 standard. In this case, receiver unit 210 converts the differential interface signals into single-ended interface signals. When internal interface 115 is used as data source, receiver unit 210 may include data driver components for decoupling the data signals, or it may be omitted altogether.

The interface signals conditioned in this manner are forwarded to a protocol unit 220. Since the interface signals include the entire data traffic between regulator unit 120 or interface unit 110 and position measuring device 20, protocol unit 220 separates from the interface signals position values Ti that are relevant for the further processing and forwards them to a processing unit 230.

Processing unit 230 uses at least two preceding position values $\phi i$ and the time interval of their arrival to calculate a movement value $\omega$, which in the preferred and also the least complicated case, is an estimate of the speed (in the present example, the angular velocity), the calculation consisting of forming the difference quotient from the two position values $\phi i-1$, $\phi i-2$ received last, and query interval $\Delta t$. Additional suitable movement values $\omega$ are acceleration values or a jerk, i.e., a temporal change in an acceleration. By adding the most recent of the position values used for determining movement value $\omega$ and the change in position that is calculated on the basis of movement value $\omega$ and the known time until the arrival of a position value to be checked (which in the preferred case, is query interval $\Delta t$ once again), processing unit 230 then calculates an expected value $\phi E$ for position value $\phi i$ to be checked.

Since only the position values $\phi i$ requested by regulator unit 120 are available to monitoring unit 200, the calculation of expected value $\phi E$ is imprecise as a matter of principle. In the above example, for instance, movement value $\omega$ (the angular velocity) is able to be precisely determined only if a constant angular velocity prevails between position values $\phi i-1$, $\phi i-2$ used for the calculation. On the other hand, if an accelerated movement is involved, then the estimate of the angular velocity becomes less precise as the amount of the acceleration increases. It is in the nature of things that a maximum deviation occurs at maximally allowed acceleration $\alpha max$ that may arise in position measuring device 20. Maximally allowed acceleration $\alpha max$ is either a limit value of position measuring device 20 itself, or a limit value of motor 10, which in turn may depend on the maximally allowed acceleration of the machine component driven by motor shaft 15. Furthermore, the calculation of expected value $\phi E$ is also based on the assumption that a constant angular velocity prevails in the movement from the last detected position value $\phi$i-1 to position value $\phi$i to be predicted, Here, too, the maximum deviation from the actual value is obtained at maximally possible acceleration $\alpha$max. Despite these inaccuracies, a maximum position interval $\Delta\phi$, in which—starting from expected value $\phi$E—position value $\phi$i to be checked must lie, is able to be indicated by superposing the extreme cases. That is to say, maximum position interval $\Delta\phi$ indicates the greatest change in position that may occur during the time until position value $\phi$i to be checked arrives, taking the error in the determination of movement value $\omega$ and a maximum change in the position value restricted by drive parameters (e.g., maximum acceleration) into account.

Using the known maximum position interval $\Delta\phi$ and calculated expected value $\phi$E, processing unit 230 determines a position expectation interval $\Delta\phi$E and forwards it to a comparator unit 240.

If the current position value $\phi$i to be checked then arrives at comparator unit 240 from protocol unit 220, the comparator unit compares this position value $\phi$i with the limits of position expectation interval $\Delta\phi$E and outputs a signal S, which indicates the result of the comparison.

The use of the two most recently received position values $\phi$i-1, $\phi$i-2 for determining position expectation interval $\Delta\phi$E for position value $\phi$i to be checked, and occurring directly following the two position values $\phi$i-1, $\phi$i-2 arriving last, is optimal with respect to monitoring safety inasmuch as each position value $\phi$i is checked. When the demands on monitoring safety are lower, however, it is possible to determine movement value $\omega$ from position values $\phi$i that arrive at monitoring unit 200 at a time interval of a first integral multiple of query interval N1*$\Delta$t. In the same manner, it is possible to calculate position expectation interval $\Delta\phi$E for a future position value $\phi$i that arrives at a time interval of a second integral multiple of query interval N2*$\Delta$t. For example, every tenth position value $\phi$i (N1=10) may be utilized for determining movement value $\omega$, and a position expectation interval $\Delta\phi$E be calculated only for every tenth position value $\phi$i (N2=10) and the comparison performed.

It is especially advantageous if all time-consuming calculations have been concluded even before position value $\phi$i to be checked arrives, so that only two digital comparison operations are still left to be performed in comparator unit 240 once position value $\phi$i to be checked has arrived. Inasmuch as comparison operations are among the operations that are able to be carried out the fastest in digital technology, signal S and current position value $\phi$i are available to regulator unit 130 or converter unit 120 practically simultaneously in this case. One consequence of a faulty position value $\phi$i is therefore able to be prevented in reliable manner.

In an advantageous manner, a memory unit 250 is provided in monitoring unit 200, in which data required in processing unit 230 are storable, in particular maximum position interval $\Delta\phi$ valid for the drive, and query interval $\Delta$t. To allow flexible use of monitoring unit 200, memory unit 250 is preferably developed as volatile memory (RAM) or as rewritable, non-volatile memory (EEPROM or flash memory). The programming of memory unit 250 may be done via a separate interface such as an I2C interface, or else via internal interface 115 and/or data transmission channel 25.

In the same manner, it may be advantageous to also provide a time measuring unit 260 in monitoring unit 200, with whose aid query interval $\Delta$t is able to be measured. In this case, it may be dispensed with setting monitoring unit 200 to a fixed value for query interval $\Delta$t, or to provide an option for transmitting query interval $\Delta$t to monitoring unit 200 and storing it. But even if the setpoint value for query interval $\Delta$t is known in monitoring unit 200, time measuring unit 260 may be used to further improve the likelihood of discovering faulty position values $\phi$i, because it may be utilized, for one, to check that specified query interval $\Delta$t is adhered to and, for another, to allow permitted time fluctuations of query interval $\Delta$t to be taken into account in processing unit 230 for the calculations.

Figure 3:
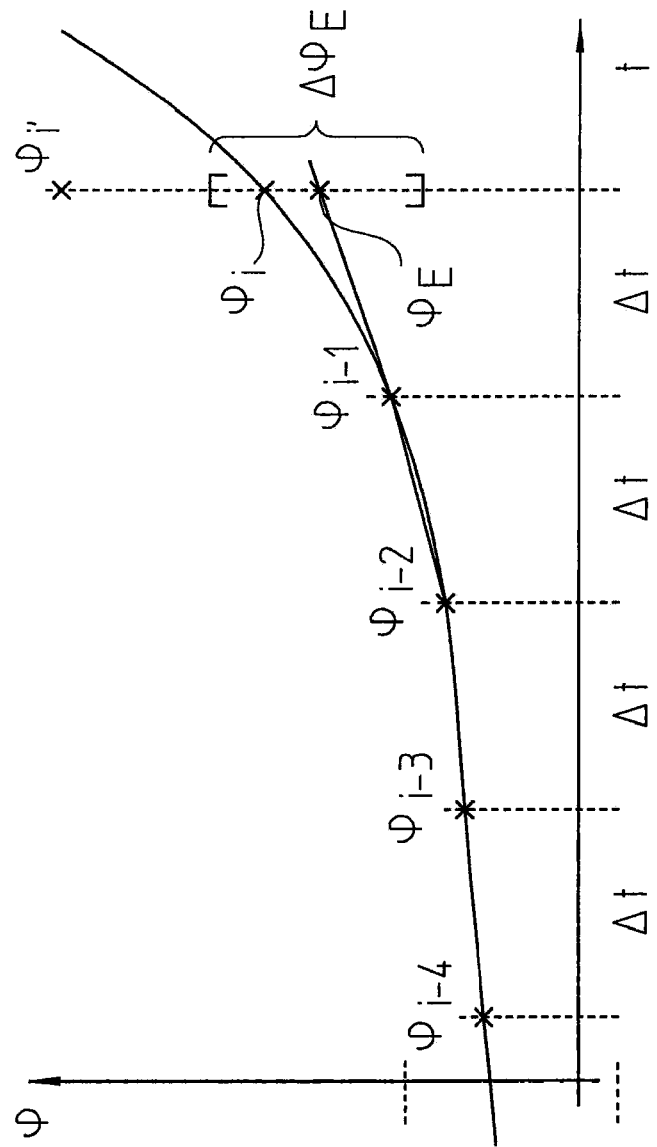
FIG. 3 is a diagram of a movement sequence.

FIG. 3 shows a diagram of a movement sequence. The horizontal axis is a time axis, and position values $\phi$i, which arrive at monitoring unit 200 at time intervals of a query interval $\Delta$t, are plotted in the vertical direction. As the plotted path curve illustrates, a movement at a constant speed is taking place between position values $\phi$i-4 and $\phi$i-2, which transitions into an accelerated movement starting with position value $\phi$i-2.

To check a position value $\phi$i, an estimated value for the angular velocity is first produced with the aid of points $\phi$i-1 and $\phi$i-2 and known query interval $\Delta$t by forming a difference quotient. This estimated value is utilized as movement value $\omega$ for determining expected value $\phi$E. With expected value $\phi$E as average value, a position expectation interval $\Delta\phi$E results at the known position interval $\Delta\phi$. If currently arriving position value $\phi$i to be checked then lies within this position expectation interval $\Delta\phi$E, it may be assumed with a very high degree of probability that no error is present and that position value $\phi$i has been generated and transmitted correctly. If it lies outside position expectation interval $\Delta\phi$E (denoted as $\phi$i' in FIG. 3), then an error has occurred in the generation or transmission of position value $\phi$i.

FIG. 4 shows a flow chart of a method according to an example embodiment of the present invention. After switch-on or prior to the start of the control action, each step 300 through 330 is executed only once, in preparatory manner; steps 340 through 370 constitute the actual main loop of the method during an ongoing drive control. Step 380 is used for error treatment if a faulty position value has occurred.

After switch-on, maximum acceleration $\alpha$max and query interval $\Delta$t are first determined in a step 300, for instance by readout from memory unit 250. With the aid of these values, maximum position interval $\Delta\phi$ is then calculated in a step 310. As an alternative, however, maximum position interval $\Delta\phi$ may also already be stored in memory unit 250. Since no current position values are available yet after switch-on, a position value $\phi$i-2 is first received in step 320, and then a position value $\phi$i-1 in step 330. The instant of the start of the control action, from which point on position values $\phi$i from position measuring device 20 are thus received continuously at monitoring unit 200, can be signaled to monitoring unit 200, for instance by regulator unit 120.

The main loop of the method begins with step 340, in which the determination of position expectation interval $\Delta\phi$E is summarized. In this example embodiment, movement value $\omega$ (the angular velocity) is calculated first by forming the difference quotient from position values $\phi$i-1, $\phi$i-2 and query interval $\Delta$t. Starting from position value $\phi$i-1, expected value $\phi$E is subsequently calculated by addition of the change in position, which is defined by movement value $\omega$ and query interval $\Delta$t. Then, position expectation interval $\Delta\phi$E is determined using expected value $\phi$E and maximum position interval $\Delta\phi$.

In step 350, current position value $\phi$i to be checked is received.

The check as to whether position value $\phi$i lies within position expectation interval $\Delta\phi$E takes place in step 360. It should specifically be pointed out here that all calculations have already been concluded by the time current position value $\phi$i is received, and only the simple and rapid comparison of position value ϕi to position expectation interval ΔϕE is required in order to detect an error.

If position value ϕi lies within position expectation interval ΔϕE, then the method continues with step 370, in which current position value ϕi-1 is assigned to position value ϕi-2, and position value ϕi is assigned to position value ϕi-1. The loop is subsequently closed by repeating step 340.

If position value ϕi does not lie within position expectation interval ΔϕE, then an error treatment takes place in step 380. For example, monitoring unit 200 signals an error to regulator unit 120 or converter unit 130 by error signal S. Depending on the error tolerance of the drive control, the method may be terminated by step 380, or it may be continued by step 370.

The effectiveness of a monitoring unit 200 will now be demonstrated using a specific numerical example. A rotary encoder will be used as position measuring device 20 because the highest accelerations may occur in these encoders. A maximum acceleration of $\alpha_{max}=10000$ rad/s$^2$ is assumed for this example. A typical value for a query interval is $\Delta t=256$ μs. An estimated velocity value, which is calculated by forming the differential quotient from the two most recently received position values ϕi-2, ϕi-1 and query interval Δt, is once again assumed as movement value ω. At maximum acceleration $\alpha_{max}$, this results in a maximum error of $$\Delta\phi 1 = \pm \alpha_{max} * \Delta t^2.$$

For the calculation of expected value ϕE, an additional error of $$\Delta\phi 2 = \pm 0.5 * \alpha_{max} * \Delta t^2$$

occurs at a maximum acceleration $\alpha_{max}$ in relation to a constant velocity. Disadvantageous superposing of errors Δϕ1 and Δϕ2 results in a position interval Δϕ of $$\Delta\phi = \pm 1.5 * \alpha_{max} * \Delta t^2.$$

Using the assumed values above, a position interval Δϕ of ±0.562° is the result. Related to a full rotation of the rotary encoder, a diagnosis coverage degree of more than 99.6% is therefore already obtained in the least advantageous case. In practice, considerably higher values are achievable for the degree of diagnosis coverage, because the inertia of motor 10 or the moved machine component reduces maximally occurring acceleration $\alpha_{max}$ to a considerable degree.

The exemplary embodiments described relate to rotary movements. However, a monitoring unit and method are also suitable for linear movements.

Since monitoring unit 200 is representable as purely digital circuit, it is especially suitable for realization in a programmable logic component (such as an FPGA) or an application-specific integrated circuit (ASIC). Furthermore, there is the option of using a microcontroller for the realization and to implement the method as a computer program. In addition, monitoring module 200 may be a software module. This software module may advantageously be executed on a control computer in regulator unit 120, in parallel and independently of other programs.

Monitoring unit 200 is a safety-relevant unit. In order to be able to discover an internal error of monitoring unit 200, it is advantageous to implement the unit redundantly, either entirely or partially, in order to allow a cross check to be performed of the determined values (position interval ϕi, expected value ϕE, position expectation interval ΔϕE, error signal S). In the same manner, it is possible to use known methods, e.g., a check as to whether forced errors are reliably detected ("forced dynamization").

The monitoring unit 200 and the method for monitoring the detection of position values may be modified and adapted to various requirements.

What is claimed is:

1. A method for checking position values using a monitoring unit, to which position values of a position measuring device are supplied at time intervals of a query interval, comprising:
   calculating a movement value from at least two position values and a time interval of arrival of the at least two position values;
   calculating an expected value for a position value to be checked that follows the at least two position values by adding a most recent of the at least two position values and a change in position that results from the movement value and a time until the position value to be checked arrives;
   determining a position expectation interval from the expected value and a maximum position interval;
   comparing the position value to be checked to the position expectation interval; and
   outputting a signal that indicates a result of the comparison.

2. The method according to claim 1, wherein the movement value includes at least one of (a) a speed value, (b) an acceleration value, and (c) a jerk.

3. The method according to claim 1, wherein the movement value includes an estimated speed value that is formed by generating a differential quotient from the two position values that arrived last at the monitoring unit and from the query interval.

4. The method according to claim 1, wherein the determination of the position expectation interval is performed prior to the arrival of the position value to be checked.

5. The method according to claim 1, further comprising measuring the query interval by a time measurement unit of the monitoring unit.

6. A monitoring unit for checking position values transmitted from a position measuring device to a drive control at time intervals of a query interval, comprising:
   a processing unit adapted: to receive the transmitted position values; to calculate a movement value from at least two position values and from the time interval of arrival of the at least two position values; to calculate an expected value for a position value to be checked that follows the at least two position values, by adding a most recent of the at least two position values and a change in position that results from the movement value and a time until the position value to be checked arrives; and to determine a position expectation interval from the expected value and a maximum position interval; and
   a comparator unit adapted to compare the position value to be checked to the position expectation interval and to generate a signal that indicates a result of the comparison.

7. The monitoring unit according to claim 6, further comprising a protocol unit adapted to receive interface signals, to separate position values included in the interface signals, and to output the position values to the processing unit and to the comparator unit.

8. The monitoring unit according to claim 6, further comprising a memory unit adapted to store at least one of (a) data required by the processing unit, (b) the position interval, and (c) the query interval.

9. The monitoring unit according to claim 6, further comprising a time measurement unit adapted to measure the query interval.

10. A drive control, comprising:
    a monitoring unit adapted to check position values transmitted from a position measuring device to a drive control at time intervals of a query interval, including:

a processing unit adapted: to receive the transmitted position values; to calculate a movement value from at least two position values and from the time interval of arrival of the at least two position values; to calculate an expected value for a position value to be checked that follows the at least two position values, by adding a most recent of the at least two position values and a change in position that results from the movement value and a time until the position value to be checked arrives; and to determine a position expectation interval from the expected value and a maximum position interval; and a comparator unit adapted to compare the position value to be checked to the position expectation interval and to generate a signal that indicates a result of the comparison.

\* \* \* \* \*